US008634558B2

(12) United States Patent
Reznik et al.

(10) Patent No.: US 8,634,558 B2
(45) Date of Patent: *Jan. 21, 2014

(54) METHOD AND SYSTEM FOR ENHANCING CRYTOGRAPHIC CAPABILITIES OF A WIRELESS DEVICE USING BROADCASTED RANDOM NOISE

(75) Inventors: Alexander Reznik, Titusville, NJ (US); Alain C. Briancon, Poolesville, MD (US); Yevgeniy Dodis, New York, NY (US); Yogendra C. Shah, Exton, PA (US); Chunxuan Ye, King of Prussia, PA (US); Robert A. DiFazio, Geenlawn, NY (US); Inhyok Cha, Yardley, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/548,803
(22) Filed: Jul. 13, 2012
(65) Prior Publication Data
US 2012/0281831 A1 Nov. 8, 2012

Related U.S. Application Data

(63) Continuation of application No. 11/871,683, filed on Oct. 12, 2007, now Pat. No. 8,254,574.

(60) Provisional application No. 60/829,198, filed on Oct. 12, 2006.

(51) Int. Cl.
*H04L 29/06* (2006.01)
(52) U.S. Cl.
USPC .......................................................... 380/268
(58) Field of Classification Search
USPC .......................................................... 380/268
See application file for complete search history.

(56) References Cited

U.S. PATENT DOCUMENTS 5,721,777 A 2/1998 Blaze 6,517,382 B2 2/2003 Flickinger et al.
(Continued)

FOREIGN PATENT DOCUMENTS

| JP | 2004-80663 | 3/2004 |
|---|---|---|
| WO | WO 2005/025178 | 3/2005 |

(Continued)

OTHER PUBLICATIONS

"Supplement to InfiniBand™, Annex A6: 120Gb/s 12x Small Form-Factor Pluggable (CXP): Interface Specification for Cables, Active Cables, & Transceivers", InfiniBand$^{SM}$ Trade Association, Sep. 2009, 94 pages.

(Continued)

*Primary Examiner* — Lisa Lewis
(74) *Attorney, Agent, or Firm* — Woodcock Washburn LLP (57) ABSTRACT

A secret stream of bits begins by receiving a public random stream contained in a wireless communication signal at a transmit/receive unit. The public random stream is sampled and specific bits are extracted according to a shared common secret. These extracted bits are used to create a longer secret stream. The shared common secret may be generated using JRNSO techniques, or provided to the transmit/receive units prior to the communication session. Alternatively, one of the transmit/receive unit is assumed to be more powerful than any potential eavesdropper. In this situation, the powerful transmit/receive unit may broadcast and store a public random stream. The weaker transmit/receive unit selects select random bits of the broadcast for creating a key. The weaker transmit/receive unit sends the powerful transmit/receive unit the selected bit numbers, and powerful transmit/receive unit uses the random numbers to produce the key created by the weaker transmit/receive unit.

20 Claims, 4 Drawing Sheets

(56) References Cited

U.S. PATENT DOCUMENTS

| | | |
|---|---|---|
| 6,533,470 B2 | 3/2003 | Ahrens |
| 6,540,412 B2 | 4/2003 | Yonemura et al. |
| 6,655,995 B1 | 12/2003 | Reisinger et al. |
| 7,371,965 B2 | 5/2008 | Ice |
| 2003/0131297 A1 | 7/2003 | Fischel et al. |
| 2004/0033820 A1 | 2/2004 | Lewis |
| 2005/0242987 A1 | 11/2005 | Umeno |
| 2006/0062391 A1 | 3/2006 | Lee et al. |
| 2007/0036353 A1 | 2/2007 | Reznik et al. |
| 2007/0076877 A1 | 4/2007 | Camp |
| 2007/0165845 A1 | 7/2007 | Ye et al. |
| 2007/0177729 A1 | 8/2007 | Raznik et al. |
| 2009/0267730 A1 | 10/2009 | Zhang |

FOREIGN PATENT DOCUMENTS

| | | |
|---|---|---|
| WO | WO 2006/081122 | 8/2006 |
| WO | WO 2006/081306 | 8/2006 |

OTHER PUBLICATIONS

Aumann et al., "Everlasting Security in the Bounded Storage Model", IEEE Transactions on Information Theory, Jun. 2002, 48(6), 1668-1680.

Ding, "Error Correction in the Bounded Storage Model", In Processing of the Theory of Cryptology Conference, Aug. 2004, 24 pages.

Dodis et al., "Correcting Errors without Leaking Partial Information", In Processing of the Symposium on Theory of Computing, May 2005, 654-663.

Dodis et al., "Fuzzy Extractors: How to Generate Strong Keys from Biometrics and Other Noisy Data", Eurocrypt, 2004, 523-540.

Dodis et al., "Robust Fuzzy Extractors and Authenticated Key Agreement from Close Secrets", Crypto, 2006, 18 pages.

Lu, "Encryption Against Storage-Bounded Adversaries from on-line Strong Extractors", Journal of Cryptology, 2002, 17, 257-271.

Maurer et al., "Secret-Key Agreement Over Unauthenticated Public Channels—Part I: Definition and A Completeness Result", IEEE Transactions on Information Theory, Apr. 2003, 49(4), 822-831.

Maurer et al., "Secret-Key Agreement Over Unauthenticated Public Channels—Part II: The Simulatability Condition", IEEE Transactions on Information Theory, Apr. 2003, 49(4), 832-838.

Maurer et al., "Secret-Key Agreement Over Unauthenticated Public Channels—Part III: Privacy Amplification", IEEE Transactions on Information Theory, Apr. 2003, 49(4), 839-851.

Maurer, "Conditionally-Perfect Secrecy and a Provable-Secure Randomized Cipher", Journal of Cryptology, 1992, 5(1), 53-66.

Maurer, "Secret Key Agreement by Public Discussion from Common Information", IEEE Transactions on Information Theory, 1993, 39, 733-742.

Nisan et al., "Randomness is Linear in Space", Journal of Computer and System Sciences, Feb. 1996, 52(1), 43-52.

Raz et al., "Extracting all the Randomness and Reducing the Error in Trevisan's Extractors", Journal of Computer and System Sciences, Jul. 3, 2001, 65(1), 97-128.

Trevisan et al., "Extractors and Pseudorandom Generators", Journal of the ACM, Jul. 2001, 48(4), 860-879.

Vadhan, "On Consulting Locally Computable Extractors and Cryptosystems in the Bounded Storage Model", Journal of Cryptology, Sep. 2003, 17, 34 pages.

Hershey et al., "Unconventional Cryptographic Keying Variable Management", IEEE Transactions on Communications, Jan. 1995, 43(1), 1-4.

METHOD AND SYSTEM FOR ENHANCING CRYTOGRAPHIC CAPABILITIES OF A WIRELESS DEVICE USING BROADCASTED RANDOM NOISE

CROSS REFERENCE TO RELATED APPLICATIONS

This application is a continuation of U.S. patent application Ser. No. 11/871,683 filed on Oct. 12, 2007, now U.S. Pat. No. 8,254,574, issued Aug. 28, 2012 which claims the benefit of U.S. Provisional Patent Application No. 60/829,198 filed on Oct. 12, 2006, each of which is incorporated herein by reference in its entirety.

TECHNICAL FIELD

The present invention is related to wireless communications.

BACKGROUND

Recent developments in cryptography theory demonstrate how information theoretic secrecy can be generated from publicly accessible sources of randomness under the assumption that the potential attacker/eavesdropper's storage capability is bounded (although potentially quite large). These developments may be particularly well-suited for use in secrecy generation in wireless communication systems due to the natural broadcast nature of the wireless communication medium.

An approach to generate common secrecy from the correlation inherent in reciprocal wireless channels has been presented before and disclosed in copending and commonly assigned U.S. Patent Application Nos.: 60/826,484 filed on Sep. 21, 2006; 60/751,803 filed on Dec. 20, 2005; 60/819,023 filed on Jul. 7, 2006; Ser. No. 11/444,558 filed on May 31, 2006; and Ser. No. 11/339,958 filed on Jan. 26, 2006. This secrecy approach exploits a joint randomness not shared with others (JRNSO) characteristic of a unique channel response between wireless nodes. However, the randomness generated using this approach is typically low-rate and has relatively specific applications.

Figure 1:
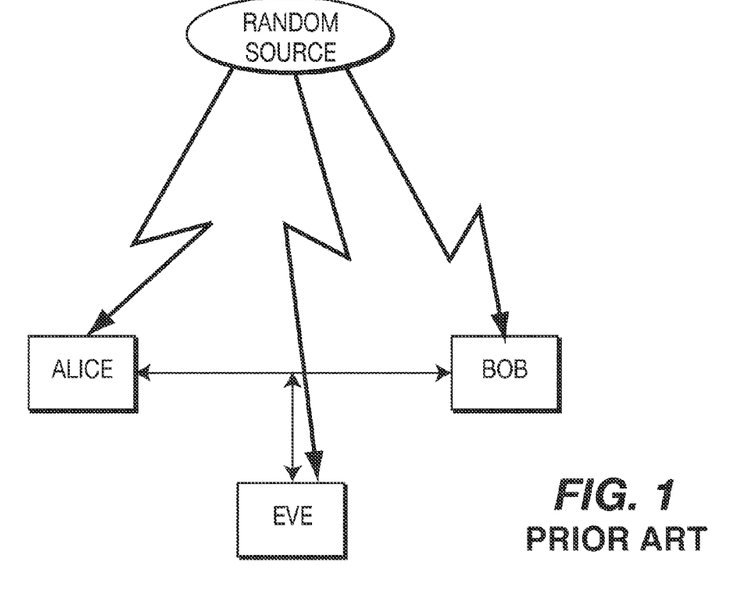
FIG. 1 shows a configuration of communication entities and a public source of randomness.

Information-theoretic security can be derived from a public (and therefore completely non-secret) source of randomness under just a bounded storage assumption on the eavesdropper. FIG. 1 shows an example of a wireless system in which bounded storage based information-theoretic security could be used to protect communications between Alice and Bob, from being discovered by Eve. The process involves two steps: sampling the random stream and extracting a "pure secret" from the sampled data. To completely understand the mathematics, the following notations are applicable:

T: the overall duration of a session
$\alpha$: public stream rate
$\beta$: input randomness/secrecy rate
$\gamma$: average/amortized rate at which the legitimate parties (Alice/Bob) can sample the public stream. If they can read at different rates, this is the minimum of the two.
N: Total data available during a session $$N = \alpha T \quad (1)$$

k: Shared secret length $$k = \beta T \quad (2)$$

n: Total number of bits Alice and Bob can sample together $$n = \gamma T \quad (3)$$

$n_0$: Total number of bits Alice and Bob can sample per block for block-wise algorithms. Since we have some freedom in choosing the block length (i.e. choosing T), we assume w.l.og. that $n/n_0$ and $N/(n/n_0)$ are integers.

$$N_0 = \frac{N}{n/n_0}$$

—total number of bits in each of the blocks for block-wise algorithms.

b: The portion of total data that the attacker (Eve) is assumed to be able to store (i.e. $0<b<1$). This is a parameter used in the analysis.

G: Attacker's actual storage capacity. This is the actual state of affairs. The relationship between G and b establishes one of the constraints driving the problem.

$$G = bN \quad (4)$$

a: Implementation back-off parameter. This is the implementation loss suffered for having a finite block length, not using theoretically ideal samplers, etc.

$\epsilon$: Probability of error in the algorithm process (probability that Alice and Bob fail to arrive at joint randomness or that it is not secret from Eve).

l: Total number of secret bits generated by Alice and Bob in addition to the k bits available at the onset.

Sampling is the key procedure through which generation of randomness is assured. The process occurs during pre-defined time intervals, called sessions, each session is of time duration T. The data during a session can therefore be considered to be a block of length N.

Figure 2:
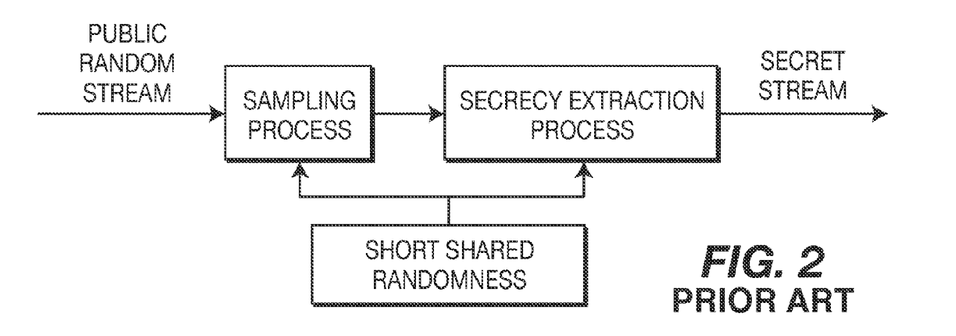
FIG. 2 shows an exemplary procedure for secrecy generation using bounded storage techniques.

In the example of FIG. 2, Alice and Bob sample the public random stream in a way that is unknown to Eve until the end of the session. Moreover, taking into account Eve's limited storage capability, the sampling should be done in such a way that it is highly unlikely Eve will have stored all of the sampled bits at the end of the sampling procedure, no matter what selective storage strategy Eve utilizes. Since Eve knows that she cannot store the complete stream, Eve's best chance to eavesdrop is to selectively sample bits, and hope that she retains the same bits sampled by Alice and Bob. Alice and Bob don't know Eve's sampling strategy, but nevertheless select their own sampling strategy so that it is likely that at least some of their data has not been stored by Eve.

To accomplish this, Alice and Bob have to sample randomly and must therefore have some way of agreeing on how they can randomly sample the same bits so that they remain completely secret from Eve, at least until the end of the session. For the purposes of this example, it is assumed that such input randomness is made available to Alice and Bob only at a finite rate $\beta$ or in finite blocks of k bits per session.

Also, Alice and Bob may themselves be limited in either what they can store: the parameter n representing the minimum of their limitations; or how often they can sample on average the parameter $\gamma$ representing the least of their average sampling rates.

A very simple example of a sampling procedure for Alice and Bob is then as follows: (1) Alice and Bob divide the session into $n/n_0$ sub-sessions, where in each sub-session they sample $n_0$ bits; (2) the shared random bits are then used to define the positions. For example, Alice and Bob partition the N-bit sub-session of public random data in $N_0$ blocks of $$N_0 = \frac{N}{n/n_0}$$

bits each. Then Alice and Bob use their shared random secret to select the same $n_0$ positions within each sub-session. Since the index of each position requires $\log N_0$ bits, $n_0 \log N_0$ total bits are needed. Therefore, the first requirement of this example is $k > n_0 \log N_0$. The inequality must in fact be strict since of the k available random bits some bits are required for extraction and these should not be reused for sampling.

It should be noted that while the size of each individual sub-session can be less than Eve's storage limit (i.e. we are permitted to have $N_0 < G$), the total constraint $N > G$ must still remain. Moreover, if the bits used to sample the stream are to be revealed, they cannot be revealed until the complete session is over.

While the sampling method outlined above is preferable because of its simplicity as well as relatively good performance, other sampling methods for the bound storage model (BSM) problem are known in the art.

Extraction, as applicable in the example of FIG. 1, is a problem of taking X perfectly random bits of which partial information is known to the adversary. The information known is quantified as no more than Y bits (of entropy). The problem is then to extract (X-Y) bits completely secret from the adversary.

Various methods exist, all of which require access to a certain amount of perfect shared randomness, which can be secret or revealed to the eavesdropper. In general, at least a number of extraction bits are needed as follows:

Number of Extraction bits=$\log n + \log 1/\epsilon$     (5)

where $\epsilon$ is the error inherent in the extraction process. Any example calculation herein will use this value; actual implementations will, of course, vary based on what technique is actually used.

Although, it is clear that the bounded storage model (BSM) work will mathematically, there is a need for practical implementations for performing BSM secrecy generation. With respect to the example above it would be beneficial to provide a short common secret to Alice and Bob, as well as a reliable source of public randomness.

SUMMARY

The process of generating a secret stream of bits begins by receiving a public random stream contained in a wireless communication signal at a transmit/receive unit. The public random stream is sampled and specific bits are extracted according to a shared common secret. These extracted bits are used to create a longer secret stream. The public random stream may be generated from sampling other wireless communication systems such as, for example, terrestrial or satellite television (TV), terrestrial or satellite radio, other one-way, two-way, or networked radio communication or sensor systems, or alternatively, the public randomness may be broadcast for the purpose of providing the public random signal. The shared common secret may be generated using JRNSO techniques, or provided to the transmit/receive units prior to the communication session.

In another embodiment, one of the transmit/receive units is assumed to be more powerful than any potential eavesdropper. In this situation, the powerful transmit/receive unit may broadcast and store a public random stream which cannot be stored by any eavesdropper in its entirety. The weaker transmit/receive unit can use a random number generator to select random bits of the broadcast to sample and create a secret key. After the broadcast is complete, the weaker transmit/receive unit sends the powerful transmit/receive unit the random numbers, and the powerful transmit/receive unit uses the random numbers to produce the same secret key created by the weaker transmit/receive unit. Finally, the BSM process is performed using the secret key to produce a secret stream.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF ILLUSTRATIVE EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 3:
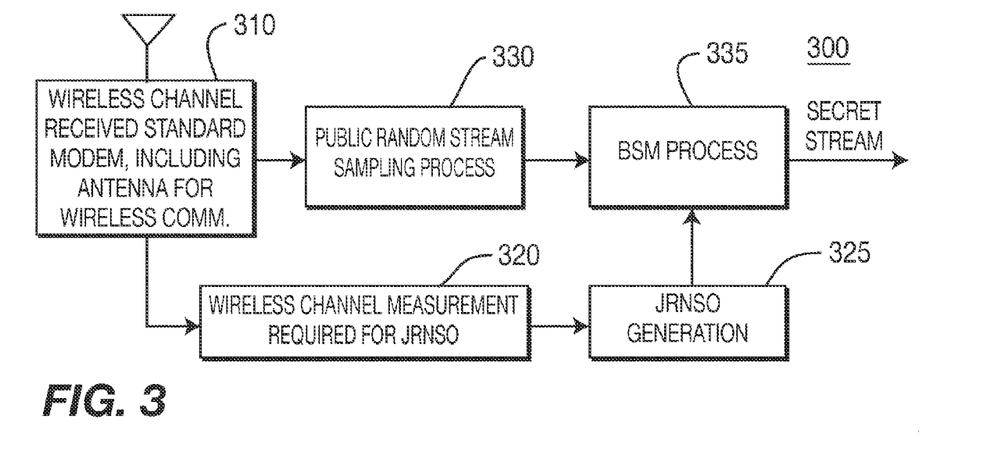
FIG. 3 shows an exemplary procedure for bounded storage model secrecy generation using JRNSO for strong secret generation.

FIG. 3 shows an exemple process 300 performed in a transmit/receive unit for performing BSM secrecy generation using JRNSO to provide the common key. The process can be performed by any pair of communication devices that share a wireless channel with sufficient reciprocity properties to generate JRNSO. Specifically, the transmit/receive unit must share with another transmit/receive unit a common wireless communication channel with a random, dynamic impulse response that is correlated when observed from Alice to Bob and from Bob to Alice (referring FIG. 1); a device for performing channel estimation; and an ability to generate common randomness. Examples of these transmit receive units include (1) a WTRU and base station in a cellular network; (2) a terminal and access point in an IEE 802.xx wireless network; (3) two peer-to-peer devices; or (4) a pair of sensors in a sensor network requiring secure communication. Alternatively, a secure, potentially intermittent, wired channel may be in existence which permits the sharing of a low-rate secret.

In FIG. 3, the process of generating a secret stream of bits begins by receiving a public random stream contained in a wireless communication signal at a standard modem attached to an antenna, at step 310. The wireless channel measurements are performed on the signal to make measurements required for JRNSO, at step 320. JRNSO generation is used to generate a common secret, at step 325. At the same time as the JRNSO measurements are made, the public random stream is sampled, at step 330. The public random stream may be a wired or wireless transmission. The public random stream may be generated from sampling other wireless communication systems such as, for example, terrestrial or satellite television (TV), terrestrial or satellite radio, other one-way, two-way, or networked radio communication or sensor systems, or alternatively, the public randomness may be broadcast for the purpose of providing the public random signal. Next, a BSM process is performed using the JRNSO generated common secret to extract the secret stream at step 340.

The process shown in FIG. 3 can be represented mathematically using three different scenario's, each one utilizing a data rate for the public random stream. For all three scenarios the number of variables are reduced according to the following preferences: $\alpha$, $\beta$, $\gamma$, $\epsilon$, $G$ are all assumed to be constants; $l$ will be maximized; $T$ will be minimized Further, $n_0$, $a$, $b$ are used as control parameters. The number of random bits generated is expressed as:

$$l = n(1-b-a) - 2\log\frac{1}{\varepsilon}. \quad (6)$$

For determining eavesdropper bound (EVB), T, the transmit/receivers need to wait long enough to exceed any eavesdropper's storage capacity. Therefore, combining equations (1) and (4) produces:

$$T \geq \frac{G}{\alpha b}. \quad (7)$$

For determining the sampling bound (SB) the transmit/receiver units need to wait long enough to sample the required data. Therefore:

$$T \geq \frac{n}{\gamma} \quad (8)$$

Finally, to determine the original secret key bound (OSKB) the transmit/receive units need to wait long enough to generate the required JRNSO randomness as well as long enough to meet all the requirements of the BSM algorithm. This results in the bound:

$$T \geq \frac{1}{\beta}\left(3\frac{\log 1/\varepsilon}{a^2(1-b)}\log\frac{3G\log 1/\varepsilon}{a^2 bn(1-b)} + \log n + \log 1/\varepsilon\right). \quad (9)$$

To demonstrate the resulting performance for each of the three public randomness stream rate scenarios, the following parameter settings are used: eavesdropper's storage limit $G=1\times 10^{12}$ bits; error probability $\epsilon=2^{-20}$, (or roughly $1\times 10^{-6}$); sampler backoff from optimality: $a=0.1$; maximum number of bits the transmit/receive units are willing to store $n=1\times 10^8$ (100 Mbits).

Figure 4:
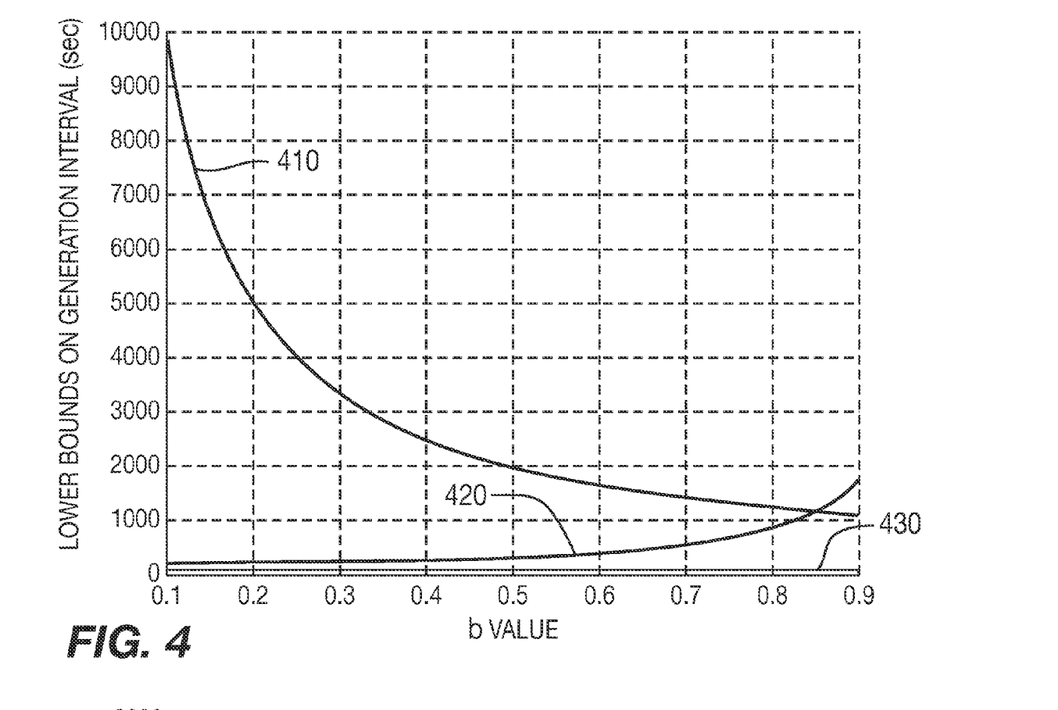
FIG. 4 shows the lower bounds on a required time for shared secrecy generation intervals according to a first scenario.
Figure 5:
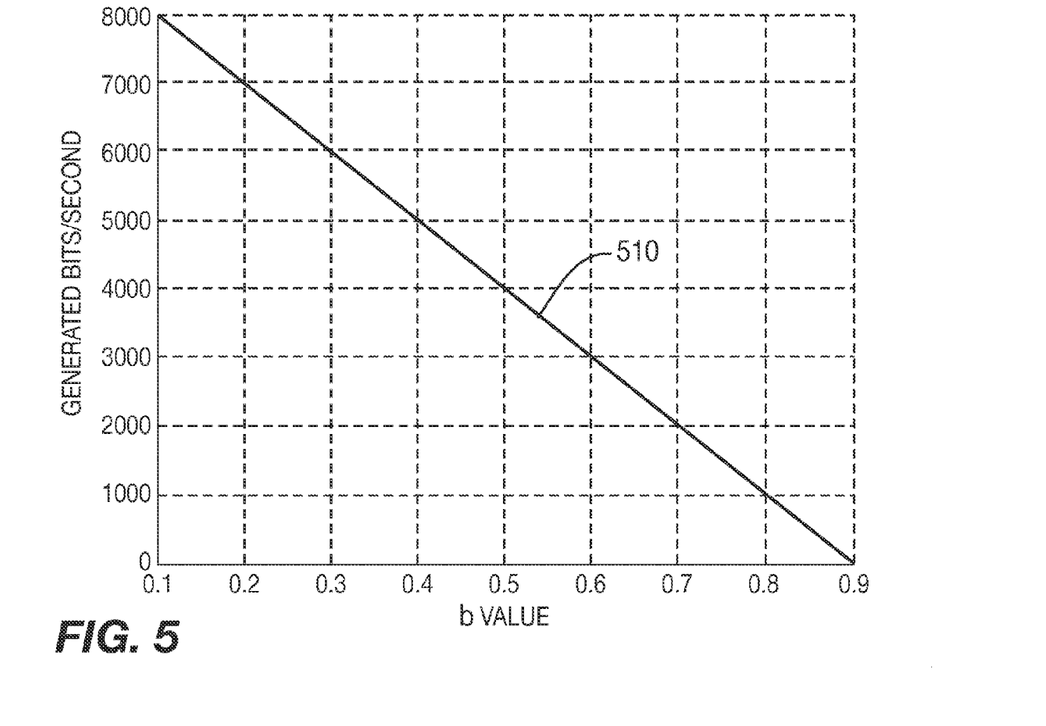
FIG. 5 shows the resulting bit rates for shared secrecy generation according to a first scenario.

Scenario 1 is shared secrecy generated via JRNSO and augmented using a BSM approach with a 1 Gbps public randomness stream, a channel sampling rate for Alice and Bob $\gamma=1\times 10^6$ bps (1 Mbps), and a shared secret rate (JRNSO equivalent) $\beta=1\times 10^3$ bps. The results of the assumptions of scenario 1 are shown in FIGS. 4 and 5. FIG. 4 shows the required minimum time interval before a single "batch" of BSM secret bits is available. The line 410 is EVB (7), line 430 is SB (8) and line 420 is OSKB (9). The EVB is shown in the range of 2000-10000 seconds (~1-3 hours).

In FIG. 5, line 510 shows the generated secret bits, which are seen to be in the order of several kilobits per second, linearly proportional to (1−b). There is a trade-off because higher BSM bit rates require longer batches.

Figure 6:
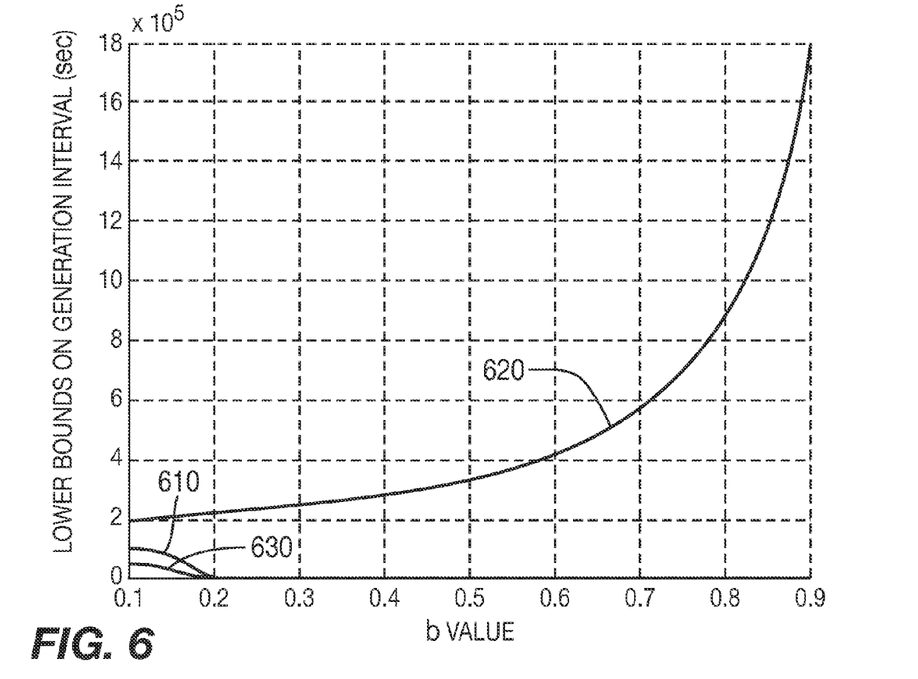
FIG. 6 shows the lower bounds on the required time for shared secrecy generation intervals according to a second scenario.
Figure 7:
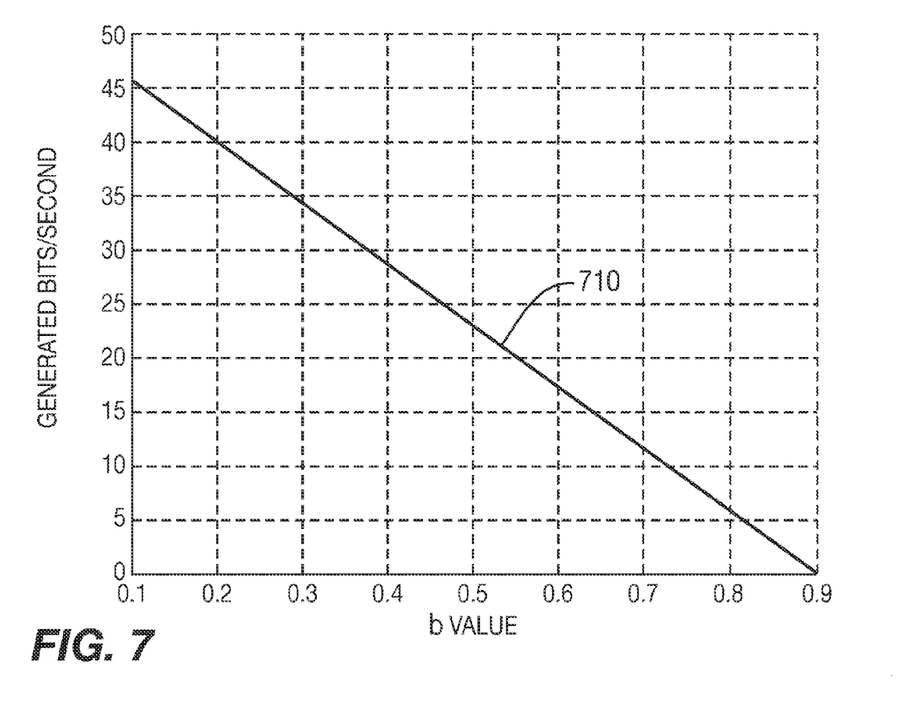
FIG. 7 shows the resulting bit rates for shared secrecy generation according to a second scenario.

The second scenario is shared secrecy generated via JRNSO with a low rate (1 bps) and augmented using a BSM approach with a public randomness rate $\alpha=1\times 10^9$ bps (1 Gbps), a channel sampling rate $\gamma=1\times 10^6$ bps (1 Mbps), and a shared secret rate (JRNSO equivalent) $\beta=1$ bps. The results of the assumptions of scenario 2 are shown in FIGS. 6 and 7. FIG. 6 shows the required minimum time interval before a single "batch" of BSM secret bits is available. Line 620 is the OSKB (9). Line 630 is the SB (8) and EVB 610 (7)—these are very low relative to the scale of bound (9). Line 620 starts at 200000 seconds (~60 hours) for b=0.1 and increases as b increases. For b=0.9 the rate is an unreasonable 180000 seconds (500 hours). The resulting BSM rate is very low (@ 45 bps for b=0.1 and going down thereafter), as shown in FIG. 7. Therefore, with a low secrecy bit rate, it is advantageous to operate at a very low value of b (i.e. >10 above the adversary storage limit). If the transmit/receive units increase their storage from 100 Mbits to 1 Gbytes ($8\times 10^9$ bits), much better performance is observed (as high as 650 bps).

The first two scenarios each assumed that both the public stream rate $\alpha$ and the JRNSO output bit generation rate $\beta$ are constant. In the third scenario, either $\beta$ alone, or both $\alpha$ and $\beta$ together can be time-varying. This third example is actually the most practical. For example, wireless devices changing direction, speed, or acceleration in a cellular network would cause the changes in the value of $\beta$. The public stream may exist as a constant-rate random source but the rate at which Alice and Bob may be able to receive them as error-free random signals may change due to factors such as changing distances of Alice and/or Bob from the physical source (e.g. transmitting station) of the public stream.

The procedure outlined in FIG. 3 can be extended in a straightforward way to accommodate the third scenario where the bit rates $\beta$ and/or $\alpha$ are time-varying. In the third scenario, any one or a combination of the following five procedures could be implemented by the transmit/receive units.

First, the transmit/receive units could try to maintain the total bit generation rate at a constant value. Depending on the degree of the variation of the rates of $\beta$, or $\beta$ and $\alpha$, the transmit/receive unit may be able to maintain a constant output secret bit generation rate by operating at a target rate that is sufficiently below that which can be maximally obtained, by operating with sufficient margin or other means. The margin would have to be pre-agreed between each transmit/receive unit, upon consideration of the system parameters (including a consideration of the BSM parameter G or b) and other performance requirements.

Second, the transmit/receive units, sensing a degrading variation of the output generation rate due to lowering of $\beta$ and/or α, could agree on a lower secret-bit generation rate. Making such a choice could be workable in a situation where the transmit/receive units could communicate with a lowered-level of secrecy strength upon switching to a lower secret bit generation rate. This method could be useful for a new application that would require a lower-level of secrecy.

Third, the transmit/receive units, again upon sensing a degrading variation of the output generation rate, could agree to stop secret-bit generation and other communication until sufficiently strong secret-bit generation rate is restored. This method would be useful where time was not an issue in communicating the secret data.

Fourth, the transmit/receive units, upon sensing that the current operating bit generation rate is below what can be maximally obtainable, could initiate an increase in the output bit generation rate. By storing and using these superfluous secret bits and augmenting them to secret bits that are generated when the rates are lower, Alice and Bob may be able to maintain a more constant output bit generation rate as measured (and/or accumulated) on a longer time scale. Also, Alice and Bob may agree to use longer sub-session lengths, to the extent the system operation still can perform to meet its requirements for averaging out the effect of the variation in the input rates β and/or α. Further, they may use adaptive strategies in terms of setting the sub-session length, whereby the sub-session length will be increased when either node senses increased variation of β and/or α and it will be decreased with an increase of β and/or α.

Finally, any of four strategies may be appropriately combined in an adaptive algorithm. However, it should be noted that any adaptive algorithm should be mutually pre-agreed upon by the transmit/receive units taking in to account applications, contexts, and performance requirements.

Figure 8:
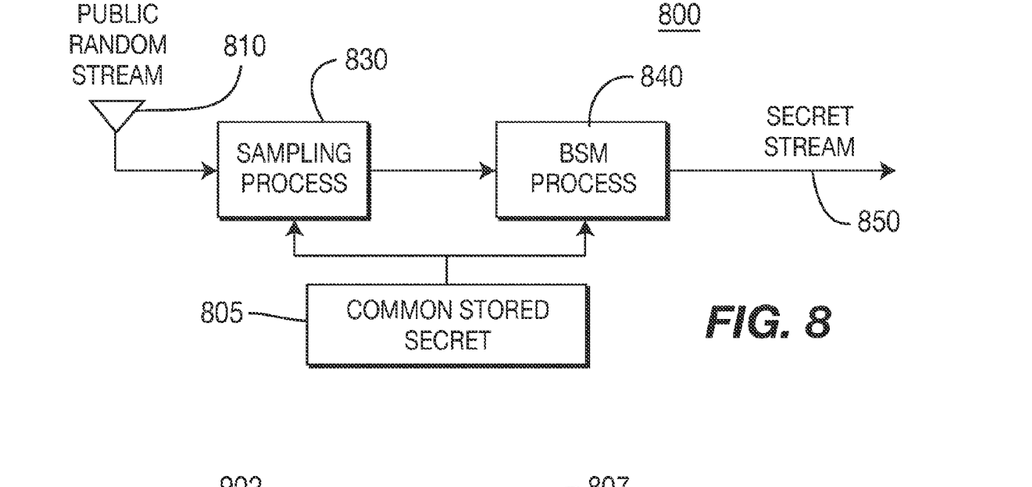
FIG. 8 shows an exemplary procedure for BSM secrecy generation using a common stored secret.

FIG. 8 shows an exemplary process 800 performed in a transmit/receive unit for BSM secrecy generation using a common stored secret 805. The process can be performed by any pair of transmit/receive units that have at some point been provided with a common stored secret. Examples of these transmit receive units include (1) a WTRU and base station in a cellular network; (2) a terminal and access point in an IEE 802.xx wireless network; (3) two peer-to-peer devices; or (4) a pair of sensors in a sensor network requiring secure communication.

In FIG. 8, the process 800 of generating a secret stream of bits begins by receiving a public random stream contained in a wireless communication signal, at step 810. The public random stream may be received by a wired or wireless medium. The public random stream may be generated from sampling other wireless communication systems such as, for example, terrestrial or satellite television (TV), terrestrial or satellite radio, other one-way, two-way, or networked radio communication or sensor systems, or alternatively, the public randomness may be broadcast for the purpose of providing the public random signal. The public random stream is sampled, at step 830. Next, a BSM process is performed using the common stored secret 805 to extract the secret stream at step 840. The secret stream is established at step 850.

The common stored secret 805 is used in the same manner as the JRNSO bits are used in the procedure of FIG. 3. Sources of the common stored secret 805 include the following: (1) a secret is prestored on a USIM which is only valid for a fixed period of time, after which a new USIM needs to be installed; (2) a secure sensor network where a sensor has a fixed lifetime; (3) a secure communication network where each computer must have a new secret installed periodically; (4) a secret which is provided while the WTRUs are located in a secure area (ie. prior to the users embarking on a mission).

Each of these cases will require different qualities of the common stored secret 805, the rate of producing JRNSO bits is no longer an issue. Instead, the life span, and length of the common stored secret is the limiting factor. For example, in the case of the USIM, or the secured network, the longest life span possible for the common stored secret 805 would be desirable. Alternatively, in the case where the secret is provided while the WTRUs are located in a secure area prior to a mission, it may be desirable to make the common stored secret be only as long as the mission in case any of the WTRUs fall into the hands of the evesdroppereavesdropper.

If the transmit/receive units (Alice and Bob) are provided $k_0$ bits, the eavesdropper's (Eve's) knowledge about their secret is defined via the statistical distance of $$\epsilon_0 = 2^{-k_0} \tag{10}$$

Each session will increase the statistical distance by $\epsilon$. Let $\epsilon_{MAX}$ be the maximal statistical distance Alice and Bob are willing to tolerate. Therefore, the maximal number of session that Alice and Bob can sustain is: $\epsilon_{MAX}/\epsilon_0$.

Since the common stored secret will eventually be used up, the device has a finite life defined as:

$$T_{LIFE} = T \times \{\epsilon_{MAX}/\epsilon_0\} \tag{11}$$

In order to determine how large of a common stored secret Alice and Bob need in order to maintain a certain life of the device for a given $\epsilon_0$ the following algorithm is used.

For each session, Alice and Bob determine how long the session is and how many bits per session are to be generated. Based on this determination, Alice and Bob determine the number of bits k needed to perform this operation. It should be noted $k \le k_0$. Alice and Bob map the existing $k_0$ bits into k bits using a secure procedure. Once the k bits are available, Alice and Bob use these to sample and extract.

Reducing the number of variables in play according to the following preferences:

The following values are fixed: α, γ, $\epsilon = \epsilon_{MAX}$, G, $T_{LIFE}$
β is no longer a meaningful parameter
Maximize l
Minimize T
Determine the size ($k_0$) of the strong secret required as defined by the parameters of the problem.
Use $n_0$, a, b, n as control parameters to do this. In fact, it is preferred to set a to be fairly low (a=0.1), $n_0$ will be implicitly defined, and b will be defined explicitly (see below), thus the problem is controlled with a single parameter n.

Equations (10) and (11) provide $$k_0 \ge -\log \epsilon_{MAX} \frac{T}{T_{LIFE}}. \tag{12}$$

However, they also provide $$k_0 \ge k + \epsilon_{MAX}\left(\frac{T_{LIFE}}{T} - 1\right). \tag{13}$$

where k is the number of bits required for a single session. Consideration of a lower bound on k is given below:

$$k \le C_1 \frac{\log 1/\varepsilon}{a^2(1-b)} \log \frac{C_1 \alpha T}{n} \frac{\log 1/\varepsilon}{a^2(1-b)} + \log n + \log 1/\varepsilon. \tag{14}$$

Equations (12)-(14) now provide a formula for $k_0$ where $C_1$ is a constant that depends on the specific sampling method used.

A preferred setting of $C_1=3$ is used here but other values may be used.

Next, combining (7) and (8) produces:

$$b = \frac{G\gamma}{n\alpha}. \quad (15)$$

Then the expression for the number of bits generated is given as follows via (6) and (15):

$$l = n\left(1 - \frac{G\gamma}{n\alpha} - a\right) - 2\log\frac{1}{\varepsilon}. \quad (16)$$

From (16), it is clear that n has to be large enough (or b small enough) so that (16) remains positive—otherwise no bits are generated. This places a natural bound on T.

Figure 9:
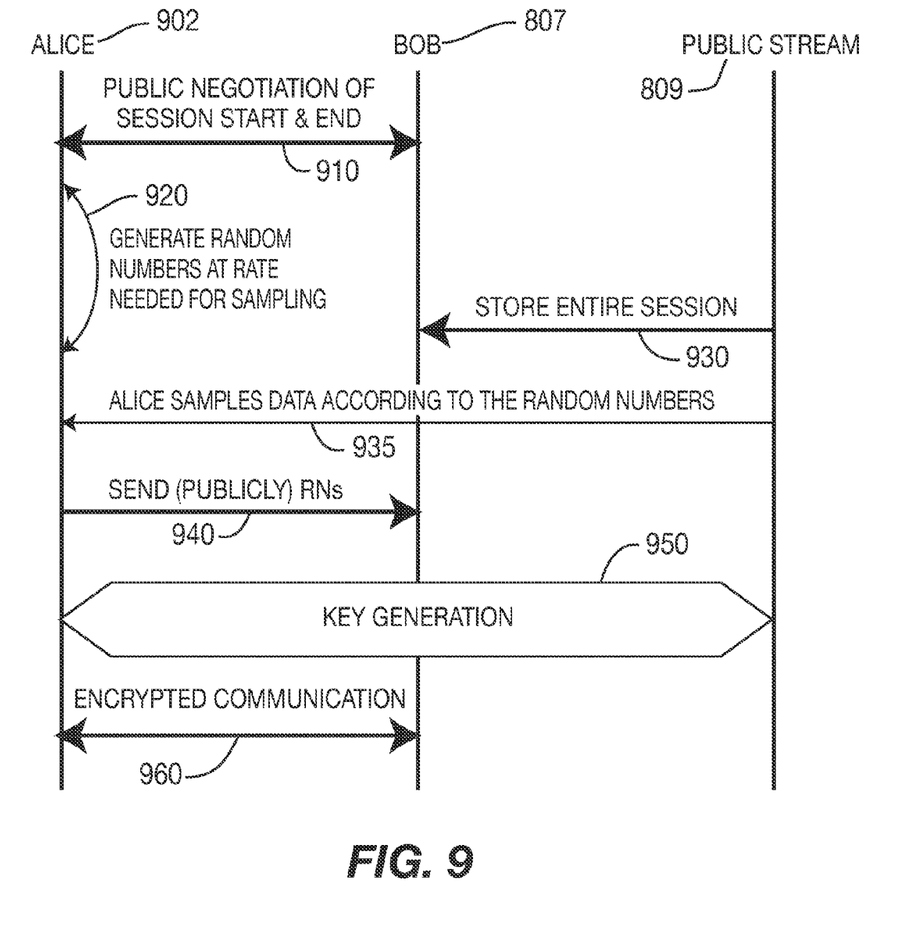
FIG. 9 shows an exemplary procedure for BSM secrecy generation where Bob is more powerful than Eve.

FIG. 9 is an alternative embodiment in which the transmit/receive units, Alice and Bob, neither share any kind of a priori secret nor have the capability to spontaneously generate one. However, one of the two parties (Bob) has a large enough storage capacity to store a full session's worth of the random data stream. The other (Alice) is still very limited in storage. Also in this embodiment it is assumed that Bob's storage capacity is larger than any potential eavesdropper (Eve). Moreover, Alice has a method for generating internal random numbers at any desired rate.

The process begins when Alice 902 and Bob 907 publicly negotiate the start and end of a communication session, at step 910. Then, Alice 902 uses its random number generator to generate a set of random numbers large enough to be used for sampling and extraction, at step 920. Alice 902 does not communicate these numbers until after the session. Next, Bob 907 stores a full session worth of random data received from the random public stream 909, at step 930. Alice 902 samples the random data according to its random numbers thereby generating a secret key, at step 935. Once the session is over Alice 902 publicly communicates to Bob the random numbers stored by Alice 902, at step 940. Bob then uses the random numbers to extract the same bits sampled by Alice 902 in order to produce the same secret key, at step 950. Encrypted communication commences at step 960 using the key sampled by Alice 902, at step 960. The operation is secure because by the time Eve (not pictured) might learn the random stream, the session is over and Eve cannot sample the random stream anymore.

The applications of this approach are similar to those described above. Bob 907 is preferably a centralized entity so that the cost of having extremely large storage is justified, while Alice 902 is a WTRU. One particular setting in which this approach may be of interest is the case of the cellular system, where Bob 907 is the base station and Alice 902 is the WTRU. The public random stream may be available from transmissions external to the usual cellular communication and received by both base station and WTRUs in a cell. Alternately, the base station itself may be used to generate the public-random signal, which it stores after it is transmitted. In fact, several base-stations may be used to do this in conjunction with storage taking place somewhere in the network that has access to the transmissions of all base-stations. Depending on the network configuration, this may be an RNC, a data gateway, such as the GGSN, etc. The WTRU procedure for sampling the stream is scheduled in a manner similar to cell measurements and paging channel check procedures during sleep, thus the impact to the WTRU may be minimal.

It should be noted that all of the above embodiments could be utilized by more than two legitimate users. Additionally, another embodiment is possible with more than two legitimate users using pair-wise keys. In this embodiment, n legitimate parties can generate n(n−1)/2 pairs, and each pair can generate its own key according to the processes described above.

In another embodiment, it is assumed that Alice or Bob, but not Eve can influence the randomness of the public stream, by indicating a rate-change request using, e.g. a low-rate, uplink side-channel that is granted to authorized users only. If the public stream's randomness rates can be made to increase or decrease by requests from Alice or Bob, such control can be exploited for useful purposes such as maintaining a constant output bit rate, even if input rate β degrades. This method ability may also be useful if it is suspected that Eve's storage capability has changed.

Although the features and elements of the embodiments are described in particular combinations, each feature or element can be used alone without the other features and elements of the embodiments or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed:

1. A method implemented in a first transmit/receive unit for generating a secret stream of data based on received random public noise, the method comprising:
   negotiating a session period with a second transmit/receive unit;
   generating a set of random numbers;
   generating a set of random data by sampling a random public noise stream for the session period using the set of random numbers, wherein the sampling is performed for a period of time long enough to exceed a predetermined storage limit of a potential eavesdropper;
   upon completion of the session period, transmitting the set of random numbers to the second transmit/receive unit;

generating a secret key based on the set of random data, whereby the second transmit/receive unit extracts the same secret key by sampling the random public noise stream for the session period using the random numbers; and transmitting encrypted data to the second transmit/receive unit using the secret key for encryption.

2. The method of claim 1, wherein the second transmit/receive unit is a cellular base station.

3. The method of claim 1, wherein the extracting is performed when the first transmit/receive unit is in sleep mode.

4. The method of claim 1, further comprising generating the random public noise stream at the first transmit/receive unit.

5. The method of claim 4, further comprising receiving a request to adjust a randomness rate of the random public noise stream.

6. The method of claim 5, further comprising determining that the request is received from an authorized device.

7. The method of claim 1, further comprising transmitting a request to adjust the random public noise stream's randomness rate.

8. The method of claim 1, wherein transmitting the encrypted data includes transmitting the encrypted data to a plurality of transmit/receive units.

9. The method of claim 1, wherein the random public noise stream is transmitted by a base station in a cellular network.

10. The method of claim 1, wherein the random public noise stream is transmitted as part of a non-cellular wireless communication system.

11. A first wireless transmit/receive unit (WTRU) for transmitting and receiving encrypted data using public random noise; the WTRU comprising:

a receiver that:
  receives session period negotiation data from a second WTRU, and
  receives a random public noise stream for a negotiated session period;
a memory that stores a set of random data;
a processor that executes instructions for:
  determining the negotiated session period,
  generating a set of random numbers,
  generating the set of random data by sampling the random public noise stream using the random numbers, wherein the sampling is performed for a period of time long enough to exceed a predetermined storage limit of a potential eavesdropper,
  generating a secret key based on the set of random data, whereby the second WTRU extracts the same secret key by sampling the random public noise stream for the session period using the random numbers, and
  generating encrypted data using the secret key for encryption; and a transmitter that:
  transmits the set of random numbers to the second WTRU upon completion of the negotiated session period, and
  transmits the encrypted data to the second WTRU.

12. The WTRU of claim 11, wherein the second WTRU is a cellular base station.

13. The WTRU of claim 11, wherein the extracting is performed when the first WTRU is in sleep mode.

14. The WTRU of claim 11, further comprising generating the random public noise stream at the first WTRU.

15. The WTRU of claim 14, further comprising receiving a request to adjust a randomness rate of the random public noise stream.

16. The WTRU of claim 15, further comprising determining that the request is received from an authorized device.

17. The WTRU of claim 11, further comprising transmitting a request to adjust the random public noise stream's randomness rate.

18. The WTRU of claim 11, wherein transmitting the encrypted data includes transmitting the encrypted data to a plurality of WTRUs.

19. The WTRU of claim 11, wherein the random public noise stream is transmitted by a base station in a cellular network.

20. The WTRU of claim 11, wherein the random public noise stream is transmitted as part of a non-cellular wireless communication system.

* * * * *